United States Patent [19]

Passoni

[11] Patent Number: 4,775,240

[45] Date of Patent: Oct. 4, 1988

[54] CLOSED PARALLEL-ROTOR MIXER WITH ADJUSTABLE INTERAXIAL SEPARATION

[75] Inventor: Gian C. Passoni, Monza, Italy

[73] Assignee: Pomini Farrel S.p.A., Castellanza, Italy

[21] Appl. No.: 4,104

[22] Filed: Jan. 16, 1987

[30] Foreign Application Priority Data

Jan. 21, 1986 [IT] Italy ............................. 19132 A/86

[51] Int. Cl.$^4$ ........................... B01F 7/02; B28C 1/16
[52] U.S. Cl. ...................................... 366/97; 366/85; 366/301
[58] Field of Search ................. 366/83, 84, 85, 73, 366/97, 301, 297, 298, 299, 300; 100/168

[56] References Cited

U.S. PATENT DOCUMENTS

| | | | |
|---|---|---|---|
| 1,884,055 | 10/1932 | McIlvried | 366/73 |
| 1,980,882 | 11/1934 | See | 366/73 |
| 3,764,118 | 10/1973 | Matsuoka | 366/84 |
| 3,779,522 | 12/1973 | Lodmans | 366/83 |

Primary Examiner—Robert W. Jenkins
Attorney, Agent, or Firm—Herbert Dubno

[57] ABSTRACT

A closed mixer having rotors whose axial separation is adjustable, comprising an external casing containing a mixing chamber housing two rotors with projecting lobes operating at a limited distance from one another, and caused to rotate by a motor unit via transmission means, wherein the rotors are equipped with end shafts, having a relatively small diameter, rotatably supported within opposite heads of the external casing by means of supports housed within elements which can move and be locked in a number of positions, as a result of moving which elements the distance between the axes of the rotors can be varied, there being provided holding means between the rotors and the heads of the chambers across which they extend, in order to ensure that the axial separation of the rotors is held in the various positions.

11 Claims, 6 Drawing Sheets

CLOSED PARALLEL-ROTOR MIXER WITH ADJUSTABLE INTERAXIAL SEPARATION

FIELD OF THE INVENTION

The present invention relates to a closed mixer having rotors in which the distance between the axes of the rotors is adjustable so that the gap between the rotors can be varied in order to achieve the best possible gap to suit different manufacturing processes, as well as to adjust for the wear and tear of the working surfaces, thereby affording more constant operation.

BACKGROUND OF THE INVENTION

In closed mixers, especially of the type having meshing rotors, the mixing and 'cutting' action takes place mainly, or almost entirely, between the opposing surfaces of the two rotors.

In order to ensure good mixing, the distance or 'gap' between the surfaces of the rotors across which the working process is carried out is highly important in these mixers and, therefore, there is a considerable advantage in being able to choose this distance depending upon the type of manufacturing process to be carried out.

As time goes by, wear and tear of the working surfaces of the rotors also takes place, resulting in ever increasing play between the rotors to the extent that the working features of the machine are modified, the mixing becoming progressively worse until it is necessary to replace the rotors or to overhaul them, refacing the surfaces by means of welding, so as to obtain the original geometrical form.

These actions are complicated and costly and the machine must be kept inoperative for a long time in order to allow the rotors to be dismounted, to be replaced or to be overhauled.

It is therefore important to provide a mixer, especially of the type having meshing rotors, in which it is possible both to vary the gap between the rotors to suit the various conditions of use and to allow for the wear and tear of the rotors to be compensated, thereby allowing these rotors to be used for a long time before overhauling and rebuilding the worn surfaces, thus ensuring the best working condition over long periods.

These results are achieved by the present invention, which provides a closed mixer having rotors whose axial separation is adjustable, comprising an external casing housing a mixing chamber containing two rotors with projecting lobes operating at a limited distance from one another, and caused to rotate by a motor unit via transmission means, wherein the rotors are equipped with end shafts, having a relatively small diameter, rotatably supported within opposite heads of the external casing by means of supports housed within elements which can move and be locked in a number of positions. The elements are moved to vary the distance between the axes of the rotors. Holding means are provided between the rotors and the heads of the chambers across which they extend in order to ensure that the axial separation of the rotors is maintained in the various positions.

In a particular embodiment, the rotors have meshing lobes, whose complementary profiles define throughout their rotation one or more regions at short distance between the mutually juxtaposed working surfaces.

According to one embodiment of the invention, the moving elements housing the supports for the rotors comprise, for each head, two rings rotatably carried within the respective head of the external casing of the mixer, and housing the supports for the rotors in an eccentric manner. Controls are provided for causing rotation of the rings, thus varying the position of the axes of the rotation of the rotors. Means are also provided for locking the rings in the wanted positions.

The means for rotating the rings may suitably consist of a worm interposed between the rings and meshing with worm wheel teeth extending around the perimeter of the rings themselves. The worm is rotated by a suitable control via a speed reducing unit.

The locking means may comprise indentations, cutouts, holes or the like provided on the surfaces of each eccentric ring, in one or more of which there is inserted either a peg or a locking key secured to the external casing of the mixer, or locking screws adjustable in different positions, or the like. The holding means provided between the rotors and the heads of the chamber may comprise front sealing rings acting against flat surfaces which join the ends of the rotors to their respective support shafts, the sealing rings, which are carried by the head walls of the mixing chambers, having a larger internal diameter than the diameter of the support shafts, so that the support shafts are allowed lateral displacement, as required, internally. Alternatively, the holding means provided between the rotors and the heads of the chamber may comprise radial sealing rings acting on the cylindrical surfaces of the support shafts for the rotors carried by extensions of the eccentric rings and rotating together with them within the head walls of the mixing chambers.

In a further embodiment of the present invention, the control means for the rotation of the eccentric rings comprises a shaft tangential to the circumference of both rings carrying two worm screw parts, each formed as a screw thread directed in an opposite direction from the other end engaging with corresponding teeth extending around the perimeter of the respective eccentric ring, and caused to rotate by means of a control via a motor unit.

According to yet a further embodiment, the movable elements may comprise slides within which the support shafts for the rotors are housed, it being possible to alter the position of the slides in relation to one another by means of controllable actuating means.

The movable elements may also consist of polygonal bushes within which there are carried, in an eccentric manner, the support shafts for the rotors, the bushes being inserted within corresponding polygonal seats in the heads of the external casing of the mixer, wherein variation of the distance between the axes of the rotors is achieved by extracting the bushes from their seats and subsequently inserting them in a relatively rotated position.

BRIEF DESCRIPTION OF THE DRAWING

Additional details are provided in the following description of some embodiments of the present invention, with reference to the accompanying drawing, in which.

SPECIFIC DESCRIPTION

Figure 1:
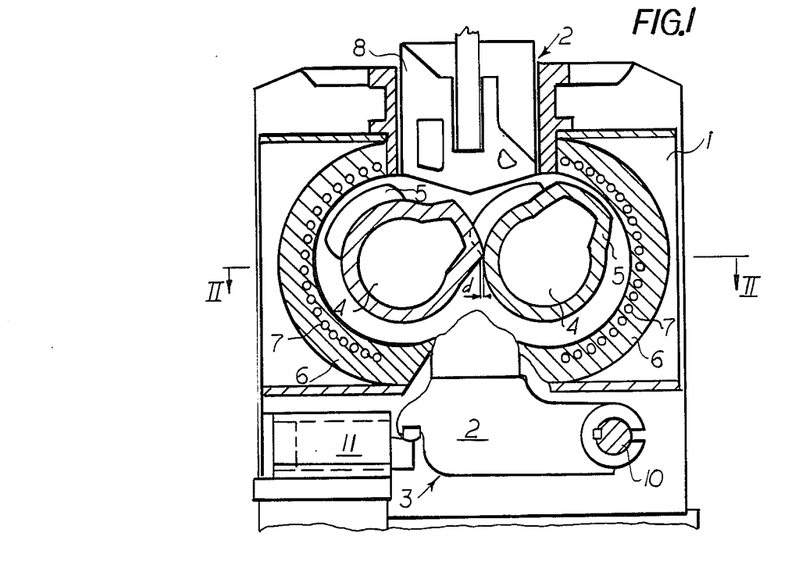
FIG. 1 is a vertical cross section of a closed mixer according to the invention, taken along line I—I of FIG. 2.
Figure 2:
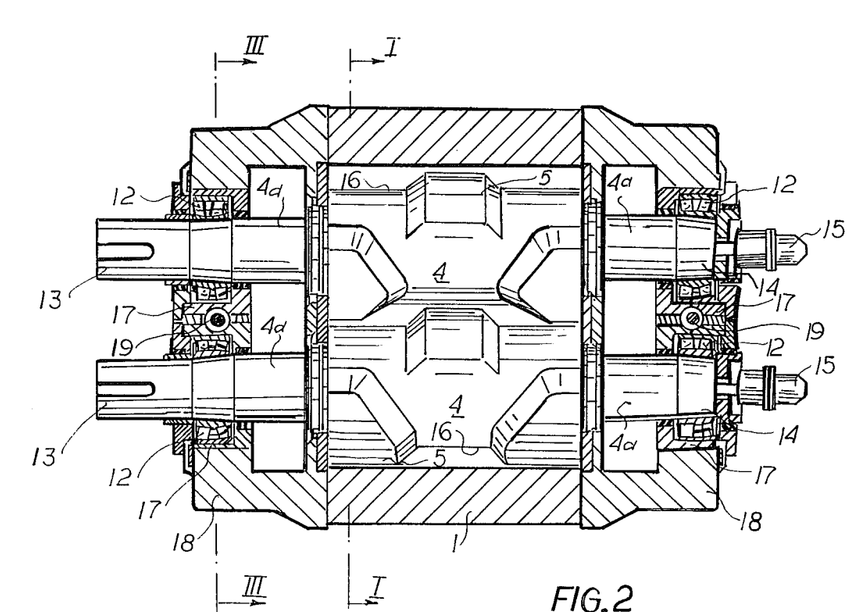
FIG. 2 is a horizontal cross section of the mixer along the line II—II of FIG. 1.

As shown in FIG. 1 and FIG. 2, a closed mixer used for mixing elastomer, plastics and similar materials comprises an external casing 1 provided with an upper opening 2 through which the material to be worked is introduced and a lower opening 3 through which the material is removed, the casing containing two meshing rotors 4 having projecting lobes 5.

The casing 1, which comprises semi-cylindrical cheeks 6 provided with internal cooling channels 7, defines an internal chamber, having a cross-section in the form of a figure 8, accommodating the rotors. The upper opening 2 has a closing plug 8 which can be lifted to allow material to be introduced and lowered to press the material into the working area, while the lower opening can be closed by a door 9 which is rotatable about a shaft 10 and can be held in position by a catch 11.

As shown in FIG. 2, the end parts of the rotors are provided with respective shafts 4a, which are supported by rotatable supports 12 and which have end pieces 13 suitable for connection, via transmission members, for example of a universal type, not shown in the drawing, to the motor unit, while the opposite end parts 14 carry rotatable connections 15 for the supply of fluid to an internal cooling circuit.

The rotors, which rotate in opposite directions, as indicated by the arrows in FIG. 1, have sections along which there is, between a lobe 5 of one rotor and the central cylindrical core 16 of the other rotor, a small distance 'd' or 'air gap' in order to impart, to the material forced within the restricted space, shear stresses enabling mixing to take place as desired.

In order to maintain the gap constant, thereby compensating for the wear and tear of the working surfaces of the rotors, or to vary the gap as required in order to obtain the best possible result during each manufacturing stage, the rotors mounted on supports 12 can be brought near to one another, as required, to allow variation in the initial gap and/or reset it periodically.

Figure 3:
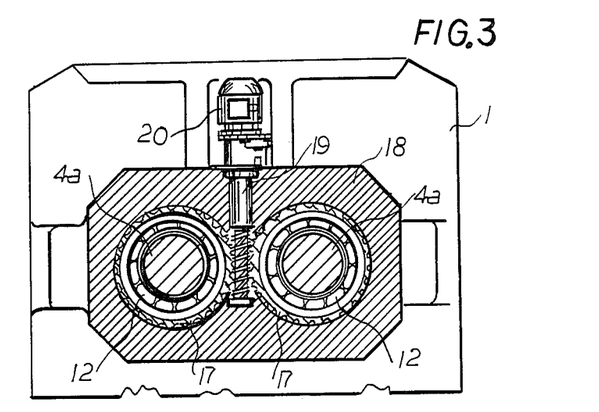
FIG. 3 is a cross section along line III—III of FIG. 2.
Figure 4:
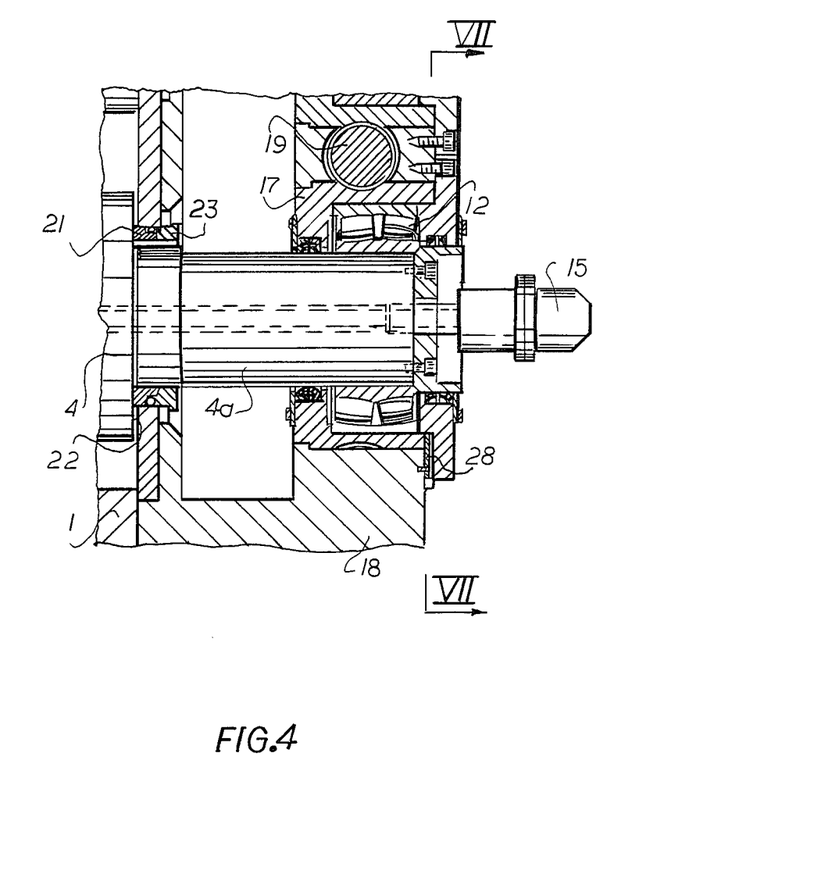
FIG. 4 is a detail of the members for supporting and holding the rotors of the mixer of FIG. 2.

In the embodiment shown in FIGS. 2, 3, and 4, the revolving supports 12 of the rotors are mounted, within eccentric rings 17, rotating within respective circular seats of the heads 18 of the casing 1.

The eccentric rings 17 have peripheral teeth to form worm wheels and the teeth are engaged by a worm screw 19 which is provided between them and which is driven by a motor 20. When the motor is actuated, the screw can produce a rotation of the eccentric rings 17, bringing the rotors 4 nearer to each other, so as to enable any gap between the rotors to be restored to the initial value, after wear and tear has increased the gap width.

As shown in greater detail in FIG. 4, the seal between the rotor and the external casing may be achieved by means of a sealing ring 21 acting against the flat surface of end 22 of the rotor 4 and held tight against it by ring 23 secured to the head 18.

The internal openings of the rings 21 and 23 have diameters which are greater than that of the end shaft 4a of a rotor 4 and are such as to enable the rotor to move transversely inside them, as a result of the rotation of the ring 17, and corresponding to the required modification of the gap width.

Figure 5:
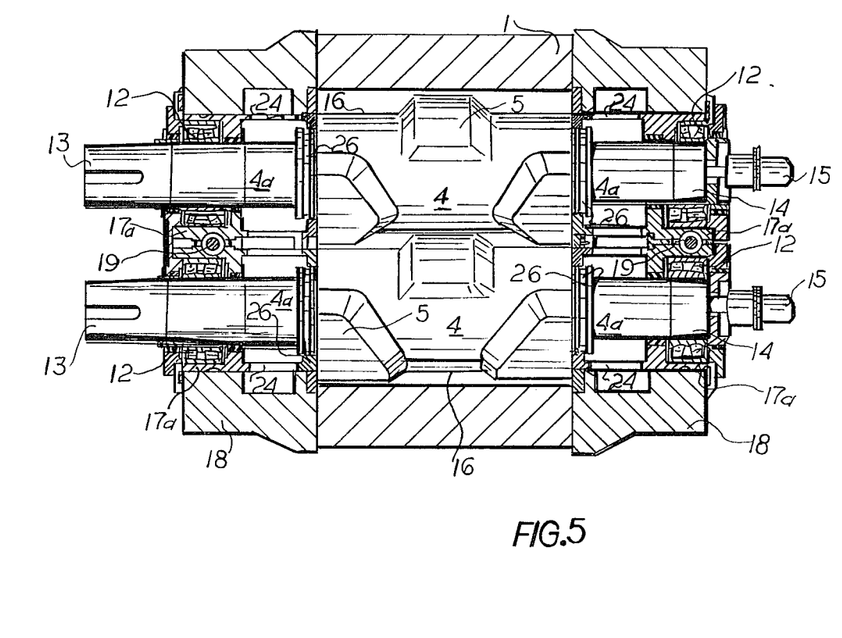
FIG. 5 is a view similar to FIG. 2 showing an alternative embodiment.
Figure 6:
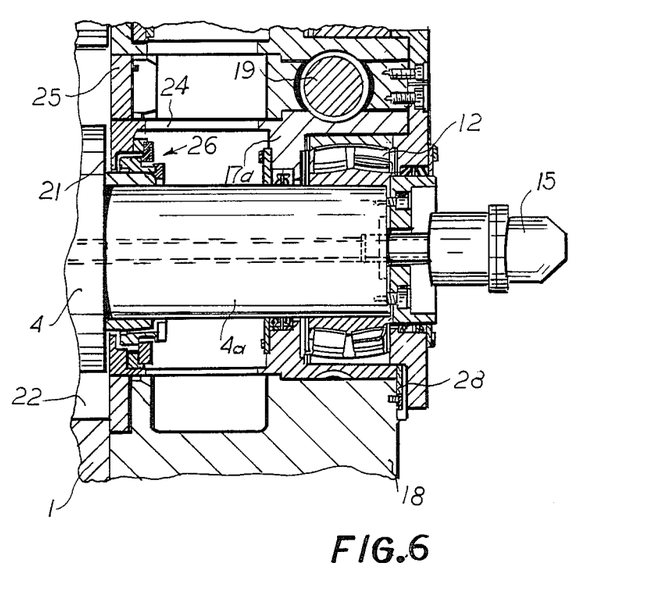
FIG. 6 is a detail of the members for supporting and holding the rotors of the mixer of FIG. 5.

In the case in which a seal is provied on the cylindrical surface of the support shaft 4a of the rotor, as shown in FIGS. 5 and 6, there is provided an eccentric ring 17a having an axially extending portion 24 stretching as far as the seal area, rotatingly housed within a seat 25 of the head 18, housing the seat for the annular sealing ring 26, making a seal on the cylindrical surface of the shaft 4a. The eccentric ring 17a, upon rotation, therefore brings about the rotation of the whole assembly of sealing rings 26 which follow the displacement of the rotor 4 and therefore guarantee a seal on the shaft 4a.

As a rule, the distance between the rotors 4 can be periodically varied when the machine is inoperative by controlling the effective value of the gap between the various parts of the rotors. However, the structure of the mixer according to the invention also allows the distance between the rotors to be varied when the machine is operating, whenever, during mixing, it is advisable to have different gaps for the various stages of a process. A display system associated, for instance, with the rotation of the motor 20 cab permit monitoring of the extent of variation in the distance between the rotor axes even when the machine is switched off and to permit equal distances to be obtained between the axes of the rotors and both the heads of the mixer.

A reduction in the gap 'd' is necessarily associated with an increase in the distance between the lobes 5 and the walls of the mixing chamber: however such increase, as opposed to the increase in the distance between the rotors, has negligible effect on the quality of mixing, which mainly takes place in the area between the rotors.

Moreover, displacement of each of the rotors causes equal spacing of the rotors from the walls but brings the rotors together by an amount of twice this value, thus the advantage of bringing the rotors closer together is more effective than spacing them from the walls.

In order to prevent the screw 19 from receiving stresses transmitted by the eccentric rings 17 or 17a, a locking device is provided to prevent the rotation of the rings 17 or 17a after their positions have been set by the motors 20.

Figure 7:
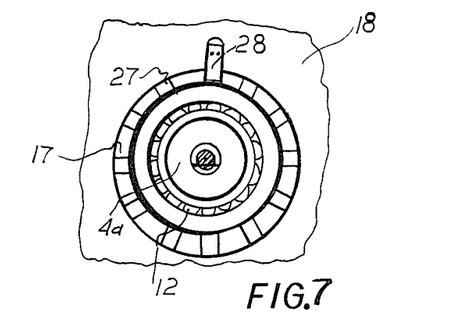
FIG. 7 is a cross-section along line VII—VII of FIG. 4.

One embodiment of such device provides for the presence of slots 27 (FIG. 7) on the outermost surface of the eccentric rings 17 or 17a. A stopping member 28 is inserted in one or more of these slots, depending upon the existing stresses, in correspondence to the required position of rotation of the eccentric ring, such stopping element being secured to the head 18 by screws or the like and being suitable to resist the possible rotational stresses of the eccentric ring.

Figure 8:
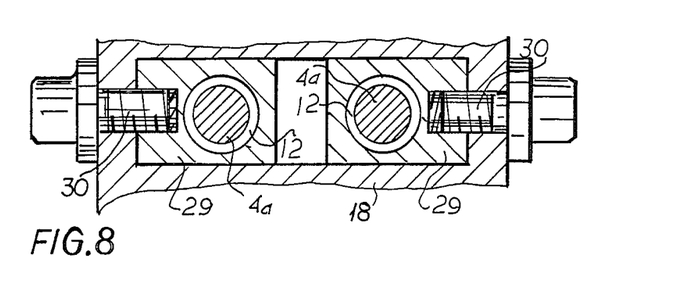
FIG. 8 is a section which shows an alternative embodiment of the device for varying the axial separation of the rotors.

As substitutes for the device using eccentric rings, as previously shown, different may be used in order to obtain a required alteration in the distance between the axes of the rotors of a mixer. For instance, as shown in FIG. 8 the rotatable support 12 for a rotor shaft 4a may be carried by a slide 29 sliding within the head 18 of the machine the slides being shaftable closer to one another by means of screws 30 controlled manually or by motor, or, as shown in diagrammatic form in FIG. 9, by means of an actuating cylinder 31.

Figure 9:
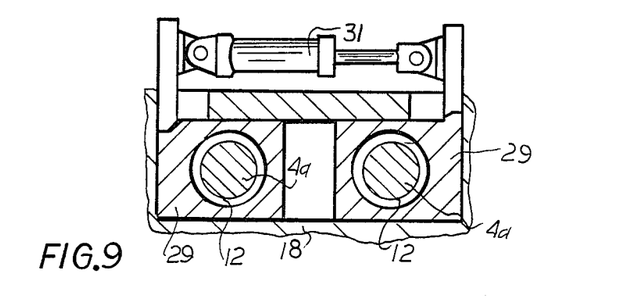
FIG. 9 is a similar view of an additional embodiment of the device for varying the axial separation of the rotors.

Also in this embodiment, the holding members can be of a type enabling eccentricity to be obtained between the shaft and the holding seat which is fixed and joined to the heads, for example by using a front sealed surface, as previously described, or by using a seat with a movable seal joined to the slides 29 and therefore suitable to follow the displacement of the shaft 4a for the support of rotors 4.

Figure 10:
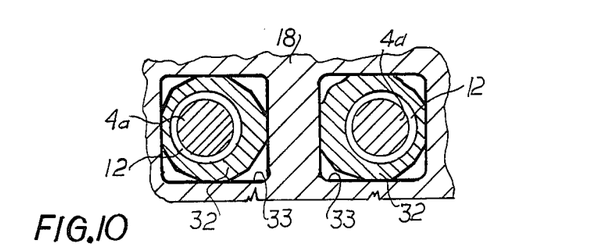
FIG. 10 is a section of still another embodiment of the device for varying the axial separation of the rotors.

The rotors 4 may also be approached to one another by other means, such as for instance eccentric bushes having a polygonal profile 32, as shown in FIG. 10, within which the support 12 of the rotors may be housed, such bushes in their turn being inserted within corresponding seats 33. In this embodiment alteration of the distance between the rotors is achieved by extracting the bushes from their seats and inserting them again after rotation a portion of each bush.

Figure 11:
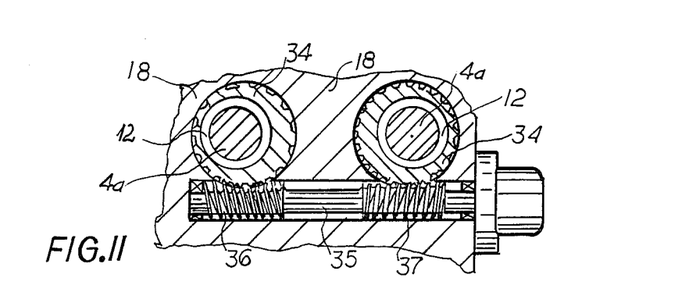
FIG. 11 is a similar view of a further embodiment of the device for varying the axial separation of the rotors.

If the supports 12 are mounted in eccentric rings having external teeth 34, as shown in FIG. 11, rotation of the rings in order to vary the distance between the rotors, both when the machine is not working either to vary the working distance, or to make up for the surface wear of the rotors, and when the machine is in operation to vary the distance during mixing, may be carried out by means of a shaft 35, provided with two worm screw parts 36, 37 having opposite-hand screw threads and operated by a motor 38.

Particularly in cases in which alteration of the distance between the rotors can be carried out when the machine is in operation, provision is made for the presence of sensors to record the closeness obtained, in association, for instance, with the rotation or the sliding of the eccentric rings, or of the slides carrying the supports 12, such sensors being able to supply an indication on a control panel of the machine, or being associated with automatic control parts for altering the distance between the rotors throughout mixing.

In order to prevent the rotors from coming too close together, especially when new rotors are involved, with the danger that they interfere with one another during rotation, there can be provided mechanical means for stopping a displacement of the rotors whereby preventing the rotors from being too near one another with the risk of possible interference, it being possible for such means to be removed or displaced when a considerable displacement of the rotors is needed to take account of the wear and tear.

I claim:

1. A closed mixer, comprising:
    an external casing defining a closed elongated mixing chamber provided with an inlet for receiving material to be mixed and an outlet for discharging mixed material;
    respective heads at opposite ends of said chamber on said casing;
    two rotors having mutually parallel axes extending through said chamber and formed with elongated rotor bodies having outwardly projecting lobes defining between the rotor bodies a mixing gap of a width increasing upon wear of surfaces of the rotor bodies, said rotors further having at opposite ends thereof respective end shafts of smaller diameter than the respective rotor bodies and extending axially into the respective heads;
    drive means including a motor unit provided with a speed-reduction transmission connectable to one of the end shafts of each of said rotors for driving said rotors to mix said material;
    respective supports rotatably receiving each of said end shafts within the respective head;
    respective elements movable in the respective each and carrying each support so that, upon movement of the said elements in each head, the interaxial spacing of said rotors is altered; and
    means at each head for locking the respective elements in each position into which the respective element is moved to maintain each altered interaxial spacing.

2. The mixer defined in claim 1 wherein said lobes of said rotors have complementary profiles so as to intermesh and define, throughout rotation of said rotors, at least one region at a short distance between the said surfaces of said rotor defining said gap.

3. The mixer defined in claim 1 wherein the said elements in each of said heads are formed by a pair of rotatable rings eccentrically receiving the respective supports for respective end shafts of said rotors, further comprising control means connected to said rings for rotating same to change said interaxial spacing, said means for locking the respective elements including means for locking said rings in desired angular positions thereof.

4. The mixer defined in claim 3 wherein said rings are formed as wormwheels with external teeth, said control means including a worm received between said rings and meshing with said teeth, and a motor connected to said worm for rotating same.

5. The mixer defined in claim 3 wherein said means for locking said rings includes recesses spaced around at least one of said rings and a respective member on the respective head insertable selectively in said recesses to lock the respective ring against rotation.

6. The mixer defined in claim 3, further comprising sealing means at each of said heads sealing the respective rotors with respect to said casing while permitting variation in said interaxial spacing.

7. The mixer defined in claim 6 wherein the sealing means includes:
    a respective flat surface formed at each end of each of said rotor bodies; and
    a respective sealing ring mounted on a wall of the respective head, surrounding the respective end shaft and sealingly engaging a respective one of said flat surfaces, said sealing ring having an internal diameter larger than the external diameter of the respective end shaft to permit shifting of said end shaft within the sealing ring.

8. The mixer defined in claim 6 wherein said sealing means includes:
    an axial extension of each of said rings extending toward the respective rotor body and surrounding the respective end shaft; and
    a sealing ring in each extension sealingly engaging the respective end shaft.

9. The mixer defined in claim 3 wherein said rings are formed as worm wheels with external teeth, said control means including a worm shaft generally tangential to both said rings and formed with respective worms of opposite hand meshing with the teeth of the respective ring, and a motor connected to said worm shaft for rotating same.

10. The mixer defined in claim 1 in which each of said elements is a respective slide shiftable in the respective head and carrying the respective support, a driver being provided for relatively displacing the slides of each head.

11. The mixer defined in claim 1 wherein said elements are polygonal bushes receivable in different angular positions in seats of the respective head and eccentrically carrying the respective supports.

* * * * *